(12) United States Patent
Rea et al.

(10) Patent No.: US 8,409,761 B2
(45) Date of Patent: Apr. 2, 2013

(54) PLATE INTERCONNECT METHOD FOR AN EMBEDDED FUEL CELL SENSOR

(75) Inventors: David D. Rea, Pittsford, NY (US); Jeffrey A. Rock, Fairport, NY (US); Jeff D. Williams, Tonawanda, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 572 days.

(21) Appl. No.: 12/707,572

(22) Filed: Feb. 17, 2010

(65) Prior Publication Data
US 2011/0200913 A1 Aug. 18, 2011

(51) Int. Cl.
*H01M 14/00* (2006.01)
*H01M 8/04* (2006.01)
*H01M 2/20* (2006.01)
*H01M 8/24* (2006.01)

(52) U.S. Cl. ............. 429/430; 429/7; 429/467; 429/468

(58) Field of Classification Search .............. 429/7, 430, 429/467, 468
See application file for complete search history.

(56) References Cited

U.S. PATENT DOCUMENTS
6,410,176 B1 * 6/2002 Genc et al. .................... 429/457
7,459,227 B2 * 12/2008 Rock et al. .................... 429/457

* cited by examiner

*Primary Examiner* — Patrick Ryan
*Assistant Examiner* — Julian Anthony
(74) *Attorney, Agent, or Firm* — John A. Miller; Miller IP Group, PLC

(57) ABSTRACT

An embedded measurement circuit for a fuel cell stack. The fuel cell stack includes a plurality of bipolar plates that include recessed areas providing conduction and retention points for the measurement circuit. The measurement circuit has a length, a width and a thickness where the width and length of the circuit are greater than the thickness of the circuit. The measurement circuit includes a stepped cut-out portion defining steps along an edge of the length of the circuit. The measurement circuit is positioned between and among the plurality of bipolar plates so that each one of the steps of the stepped cut-out portion of the measurement circuit enables electrical contact with a separate plate and the width of the circuit is perpendicular to a plane of the plates and the thickness of the circuit is along the plane of the bipolar plates.

18 Claims, 2 Drawing Sheets

PLATE INTERCONNECT METHOD FOR AN EMBEDDED FUEL CELL SENSOR

BACKGROUND OF THE INVENTION

1. Field of the Invention

This invention relates generally to an embedded measurement circuit in a fuel cell stack and, more particularly, to an embedded measurement circuit having a stepped cut-out pattern that is positioned on its edge between and retained by bipolar plates in a fuel cell stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode side catalyst to generate free protons and electrons. The protons pass through the electrolyte to the cathode. The protons react with the oxygen and the electrons in the cathode side catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes (catalyst layers) typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, a gas diffusion layer (GDL), that protects the mechanical integrity of the membrane and helps in uniform reactant and humidity distribution. The part of the MEA that separates the anode and cathode flows is called the active area, and only in this area the water vapors can be freely exchanged between the anode and cathode. MEAs are relatively expensive to manufacture and require certain humidification conditions for effective operation.

Fuel cells typically include a plurality of electrically conductive unipolar and bipolar plates alternatively assembled (stacked) with a plurality of MEAs, electrodes, gaskets, seals and gas diffusion media (also known as "soft goods"). Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a reaction by-product. The fuel cell stack also receives an anode hydrogen reactant gas that flows into the anode side of the stack. The stack also includes flow channels through which a cooling fluid flows.

A fuel cell stack includes a series of bipolar plates (separators) positioned between the several MEAs in the stack, where the bipolar plates and the MEAs are positioned between the two end plates. The bipolar plates include anode side and cathode side flow distributors (flow fields) for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. After stacking, these components are typically placed under compression to minimize electrical contact resistances and to close the seals. The end plates conduct the electricity generated by the fuel cells out of the stack. The bipolar plates also include flow channels through which a cooling fluid flows.

It is known in the art to process the electric signals of the fuel cells in a fuel cell system to determine whether the fuel cell stack is functioning as desired. Typically, electric signal processing is done every other cell because of the costs associated with monitoring every cell. Furthermore, it can be difficult to provide the necessary components in the space available to monitor every cell. In order to eliminate the necessity to connect fuel cell measurement circuits to a fuel cell stack using a plurality of interconnecting wires, it is desirable to embed such measurement circuits directly within the structure of the fuel cell stack assembly. Such an embedded measurement circuit would not add significant costs, and would allow for every fuel cell to be monitored.

SUMMARY OF THE INVENTION

In accordance with the teachings of the present invention, an embedded measurement circuit for a fuel cell stack is disclosed. The fuel cell stack includes a plurality of bipolar plates that include recessed areas providing conduction and retention points for the measurement circuit. The measurement circuit has a length, a width and a thickness where the width and length of the circuit are greater than the thickness of the circuit. The measurement circuit includes a stepped cut-out portion defining steps along an edge of the length of the circuit. The measurement circuit is positioned between and among the plurality of bipolar plates so that each of the steps of the stepped cut-out portion of the measurement circuit enables an electrical contact with a separate plate, and the width of the circuit is perpendicular to a plane of the plates and the thickness of the circuit is along the plane of the bipolar plates. The bipolar plates are staggered in a cooperative and opposite manner to the stepped cut-out portion of the measurement circuit so that the measurement circuit aligns with the plates.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an embedded measurement circuit including a stepped cut-out portion for a fuel cell stack that cooperatively aligns with bipolar plates in the stack is merely exemplary in nature, and is in no way intended to limit the invention or its applications or uses.

Figure 1:
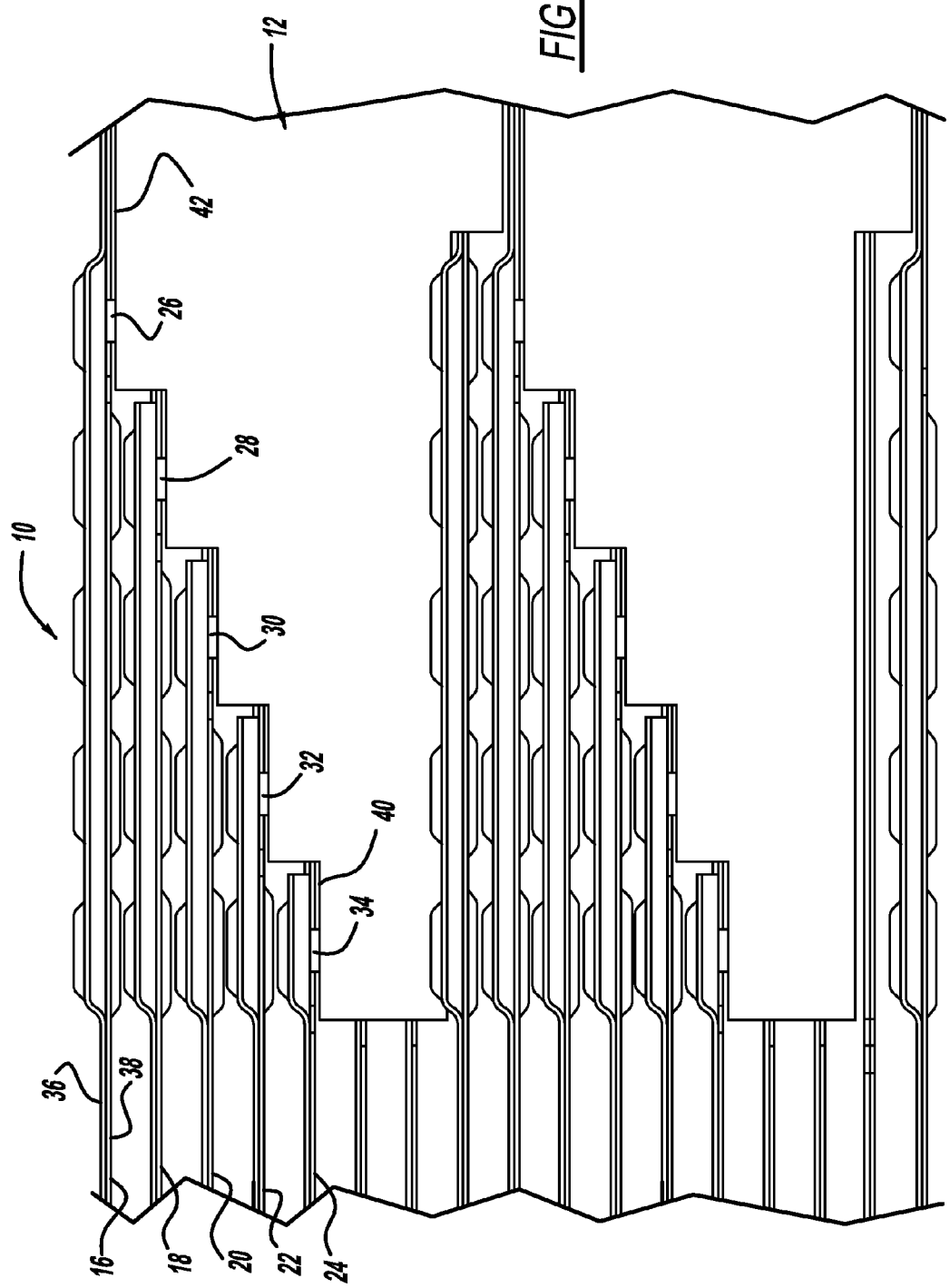
FIG. 1 is a cut-away side view of a portion of a fuel cell stack including measurement circuits embedded within several bipolar plates of the stack.
Figure 2:
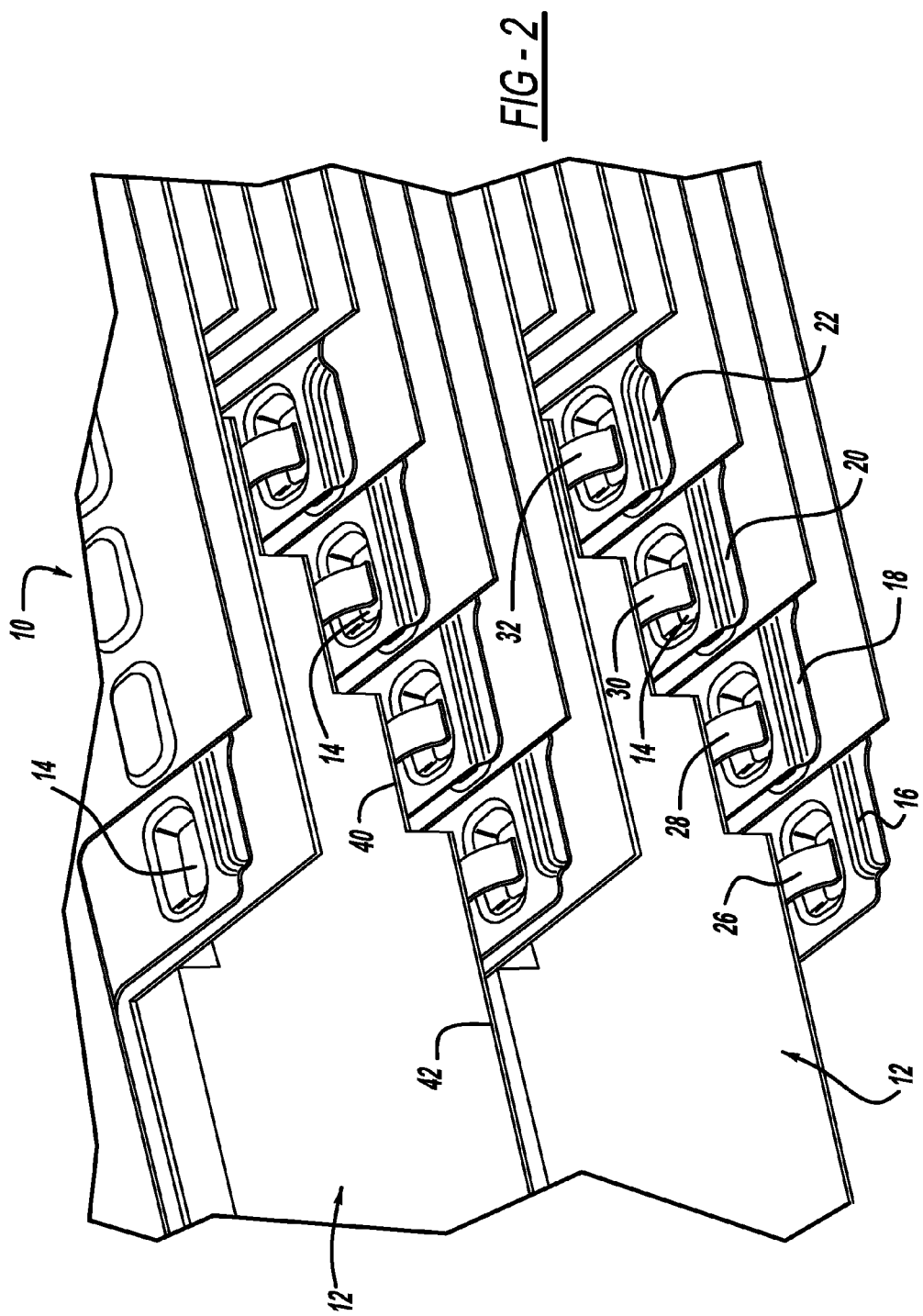
FIG. 2 is a perspective view of the fuel cell stack shown in FIG. 1 including the measurement circuits embedded within the bipolar plates.

FIG. 1 is a cut-away side view and FIG. 2 is a perspective view of a portion of a fuel cell stack 10 including a fuel cell measurement circuit 12 electrically and physically coupled to five stamped metal bipolar plates 16, 18, 20, 22 and 24, where FIG. 2 is up-side down relative to FIG. 1. Each plate 16, 18, 20, 22 and 24 includes an anode side and a cathode side defined by opposing half-plates 36 and 38. As is known to those skilled in the art, two bipolar plates (the anode side of one and the cathode side of the other) with a membrane electrode assembly (MEA) and other soft goods, such as sub-gaskets and a gas diffusion layer (GDL), make up a fuel cell. Typically, several fuel cells are connected in series to make up the fuel cell stack.

In this non-limiting embodiment, the plates 16, 18, 20, 22 and 24 are stamped metal plates, and the voltage output of the fuel cells is monitored by the measurement circuit 12, where the measurement circuit 12 is electrically coupled to the bipolar plates 16, 18, 20, 22 and 24.

As discussed above, each of the bipolar plates 16, 18, 20, 22 and 24 includes two half-plates 36 and 38 whose separation is defined by stamped features. These stamped features provide a plurality of recessed areas 14 that define the spacing between the half-plates 36 and 38, mechanically support the half-plates 36 and 38, and provide a conduction and retention point for spring-loaded clips 26, 28, 30, 32 and 34. The spring-loaded clips 26, 28, 30, 32 and 34 are electrically and mechanically coupled to the measurement circuit 12, typically by soldering, although other suitable methods for electrically and mechanically coupling the clips 26, 28, 30, 32 and 34 to the circuit 12 can also be used.

According to the invention, the measurement circuit 12 is embedded between the bipolar plates 16, 18, 20, 22 and 24 perpendicularly, i.e., where the measurement circuit 12 is positioned on its edge. In other words, the measurement circuit 12 is a circuit board having a length and width greater than its thickness. Steps 40 are cut out of an edge 42 of the measurement circuit 12 and the length of the plates 16, 18, 20, 22 and 24 are staggered in a complimentary manner so that they align with the steps 40 in the circuit 12, as shown. By turning the circuit 12 on its edge so that the width of the circuit 12 extends perpendicular to the plane of the plates 16, 18, 20, 22 and 24 and the thickness of the circuit 12 is along the plane of the plates 16, 18, 20, 22 and 24, as shown, the circuit 12 is able to align with more of the plates 16, 18, 20, 22 and 24 than if it were lying flat relative to the length of the plates.

A separate clip 26, 28, 30, 32 and 34 is coupled to each step 40. In this way, the steps 40 in the measurement circuit 12 align with ends of the stamped bipolar plates 16, 18, 20, 22 and 24 so that the measurement circuit 12 is embedded perpendicular to the plane of the bipolar plates 16, 18, 20, 22 and 24. The spring-loaded clips 26, 28, 30, 32 and 34 on the steps 40 of the measurement circuit 12 fit and clip into the recessed areas 14 of the bipolar plates 16, 18, 20, 22 and 24. This allows an essentially flat and inexpensive measurement circuit 12 to be embedded between several bipolar plates of a fuel cell stack by providing a step pattern into the edge 42 of the measurement circuit 12 and inserting the measurement circuit 12 perpendicularly to the plane of the bipolar plates 16, 18, 20, 22 and 24.

Once the spring-loaded clips 26, 28, 30, 32 and 34 are clipped into the recessed areas 14 of the bipolar plates 16, 18, 20, 22 and 24, respectively, the measurement circuit 12 is able to process the electric signals of the bipolar plates 16, 18, 20, 22 and 24 directly through the spring-loaded clips 26, 28, 30, 32 and 34. This allows for the measurement circuit 12 to be perpendicularly embedded into and be in electrical contact with the bipolar plates 16, 18, 20, 22 and 24 requiring only the spring-loaded clips 26, 28, 30, 32 and 34, thus reducing the amount of electrical components and space required to monitor the fuel cells of the fuel cell stack 10.

The orientation of the measurement circuit 12 among the bipolar plates 16, 18, 20, 22 and 24 is made possible by successively cutting the bipolar plates comprising the fuel cell stack assembly in a repeating fashion (as well as the edges of the soft goods), such that an open-ended aperture is created in each plate and the soft goods are sequentially stacked in the correct (repeating) order, thus creating a series of cavities on the side of the fuel cell stack 10, where one or more measurement circuit 12 may be installed. Therefore, the invention enables the use of embedded measurement circuitry within a fuel cell stack while requiring no additional draw depth during plate stamping operations. Previous contact methods for embedded measurement circuitry required deep stamped features which caused concerns about plate material thinning and possible failure. In addition, it minimizes the number of varying plate and soft good part numbers required to enable embedded electric signal processing.

Furthermore, by defining the complimentary mechanical dimensions of the plate recessed area and the spring-loaded contact, as well as the spring-constant of the spring-loaded contact material, the overall contact method may be defined such that the measurement circuit(s) 12 are loosely retained when installed during stack assembly, and permanently coupled when compression is applied to the stack 10 because the spring-loaded clips 26, 28, 30, 32 and 34 absorb stack compression and couple to the embedded measurement circuit 12. Because the measurement circuit(s) 12 is perpendicularly oriented to the plane of the plates and soft goods, they require a small increase in the planar area of the plates and soft goods. However, because the measurement circuit(s) 12 is embedded, the increase in the planar area of the plates and soft goods are minimized. An additional advantage of the invention is that it is scalable to any number of cells-per-measurement circuit. In addition to the benefits described above, a further advantage of the invention is it enables automated assembly and enables all identified optical communication methods.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:
1. A fuel cell stack comprising:
a plurality of stacked bipolar plates; and
a measurement circuit having a length, a width and a thickness where the width and length of the circuit are greater than the thickness of the circuit, said measurement circuit being positioned between and among the plurality of bipolar plates so that the measurement circuit is in electrical contact with a separate plate and the width of the circuit is perpendicular to a plane of the plates and the thickness of the circuit is along the plane of the bipolar plates, wherein the measurement circuit includes a stepped cut-out portion defining steps along an edge of the length of the circuit so that the measurement circuit is positioned between and among the plurality of bipolar plates so that each one of the steps of the stepped cut-out portion of the measurement circuit is in electrical contact with a separate plate and the width of the circuit.

2. The fuel cell stack according to claim 1 wherein the measurement circuit includes a plurality of spring-loaded clips where a separate clip is coupled to each step, wherein the spring-loaded clips electrically couple the measurement circuit to the bipolar plates.

3. The fuel cell stack according to claim 2 wherein each of the bipolar plates includes a recessed area, and wherein each spring-loaded clip is clipped within the recessed area of the plate.

4. The fuel cell stack according to claim 1 wherein the plurality of bipolar plates are staggered in a cooperative and opposite manner to the stepped cut-out portion of the measurement circuit so that the measurement circuit aligns with the plates.

5. The fuel cell stack according to claim 1 wherein the measurement circuit is loosely retained when installed during stack assembly, and permanently coupled to the stack when compression is applied to the stack.

6. The fuel cell stack according to claim 1 wherein the bipolar plates are stamped metal plates.

7. The fuel cell stack according to claim 5 wherein each bipolar plate includes two stamped plate halves.

8. The fuel cell stack according to claim 1 wherein the stack is part of a vehicular fuel cell system.

9. A fuel cell stack comprising:
a plurality of stamped and stacked bipolar plates, each of the bipolar plates includes a recessed area; and
a measurement circuit having a length, a width and a thickness where the width and length of the circuit are greater than the thickness of the circuit, said measurement circuit including a stepped cut-out portion defining steps along an edge of the length of the circuit, said measurement circuit being positioned between and among the plurality of bipolar plates so that the width of the circuit is perpendicular to a plane of the plates and the thickness of the circuit is along the plane of the bipolar plates, said measurement circuit including a plurality of spring-loaded clips where a separate clip is coupled to each step, wherein the plurality of bipolar plates are staggered in a cooperative and opposite manner to the stepped cut-out portion of the measurement circuit so that the measurement circuit aligns with the plates and each spring-loaded clip is clipped within the recessed area of a plate to electrically couple the plate to the measurement circuit.

10. The fuel cell stack according to claim 9 wherein each bipolar plate includes two stamped plate halves.

11. The fuel cell stack according to claim 9 wherein the at least one measurement circuit is loosely retained when installed during stack assembly, and permanently coupled when compression is applied to the stack.

12. A fuel cell stack comprising:
a plurality of stacked bipolar plates; and
a measurement circuit having a stepped cut-out portion defining steps along an edge of a length of the circuit, said measurement circuit being positioned between and among the plurality of bipolar plates so that each one of the steps of the stepped cut-out portion of the measurement circuit enables electrical contact with a separate plate, wherein the plurality of bipolar plates are staggered in a cooperative and opposite manner to the stepped cut-out portion of the measurement circuit so that the measurement circuit aligns with the plates.

13. The fuel cell stack according to claim 12 wherein the measurement circuit includes a plurality of spring-loaded clips where a separate clip is coupled to each step, wherein the spring-loaded clips electrically couple the measurement circuit to the bipolar plates.

14. The fuel cell stack according to claim 13 wherein each of the bipolar plates includes a recessed area, and wherein each spring-loaded clip is clipped within the recessed area of the plate.

15. The fuel cell stack according to claim 12 wherein the measurement circuit is loosely retained when installed during stack assembly, and permanently coupled to the stack when compression is applied to the stack.

16. The fuel cell stack according to claim 12 wherein the bipolar plates are stamped metal plates.

17. The fuel cell stack according to claim 16 wherein each bipolar plate includes two stamped plate halves.

18. The fuel cell stack according to claim 12 wherein the plurality of bipolar plates is four bipolar plates and the number of steps in the stepped cut-out portion of the measurement circuit is four steps.

* * * * *